United States Patent [19]

Sugimori

[11] Patent Number: 4,783,175
[45] Date of Patent: Nov. 8, 1988

[54] TEMPERATURE MEASURING APPARATUS CAPABLE OF DISPLAYING MEASURED TEMPERATURES IN DIFFERENT TEMPERATURE SCALES

[76] Inventor: Hideo Sugimori, 12-2 Koaza Shimokubota, Ohaza Hohsono, Seikacho, Sohraku-gun, Kyoto 619-02, Japan

[21] Appl. No.: 12,672
[22] PCT Filed: Jan. 31, 1986
[86] PCT No.: PCT/JP86/00037
  § 371 Date: Dec. 30, 1986
  § 102(e) Date: Dec. 30, 1986
[87] PCT Pub. No.: WO87/04788
  PCT Pub. Date: Aug. 13, 1987
[51] Int. Cl.$^4$ ............................................. G01K 7/00
[52] U.S. Cl. .................................. 374/170; 374/163; 128/736
[58] Field of Search ............... 374/170, 163; 128/736

[56] References Cited

U.S. PATENT DOCUMENTS

| | | | |
|---|---|---|---|
| 4,068,526 | 1/1978 | Goldstein | 374/170 |
| 4,121,462 | 10/1978 | Mohrman | 374/163 |
| 4,198,676 | 4/1980 | Varnum et al. | 374/170 |
| 4,206,649 | 6/1980 | Nagaie | 374/170 |
| 4,277,975 | 7/1981 | Pinkham | 374/170 |
| 4,321,933 | 3/1982 | Baessler | 128/736 |
| 4,423,968 | 1/1984 | Nemcek, Sr. et al. | 374/170 |
| 4,464,067 | 8/1984 | Hanaoka | 374/170 |
| 4,497,586 | 2/1985 | Nelson | 374/163 |
| 4,636,092 | 1/1987 | Heayi | 374/170 |

FOREIGN PATENT DOCUMENTS

| 0123433 | 7/1983 | Japan | 374/170 |
|---|---|---|---|
| 0187833 | 9/1985 | Japan | 374/163 |

Primary Examiner—William A. Cuchlinski, Jr.
Assistant Examiner—Thomas B. Will
Attorney, Agent, or Firm—Koda and Androlia

[57] ABSTRACT

A temperature measuring apparatus including a circuit capable of analog-converting without using an operational amplifier, a centrigrade temperature value directly detected as an electric signal to a fahrenheit temperature value and being devised so as to digitally display a measured temperature selectively in both the centrigrade and the fahrenheit temperature scales selectively A-D converting the centrigrade temperature value directly detected and the fahrenheit temperature value analog converted from the centrigrade temperature value.

1 Claim, 2 Drawing Sheets

TEMPERATURE MEASURING APPARATUS CAPABLE OF DISPLAYING MEASURED TEMPERATURES IN DIFFERENT TEMPERATURE SCALES

FIELD OF THE INVENTION

The present invention relates to a temperature measuring apparatus devised so as to display measured temperatures selectively in two kinds of temperature scale, namely in degrees centigrade and in degrees Fahrenheit.

BACKGROUND OF THE INVENTION

The most commonly used temperature scales are the centigrade scale and the Fahrenheit scale. Both of the two scales are used in some countries, while either of the two is used in some other countries. Such being the case, temperature measuring apparatus are desired, as the case may be, to have a function of displaying measured temperatures selectively in both the two scales.

A Fahrenheit temperature value $t_F$ (°F.) is related to a centigrade temperature value $t_C$ (°C.) through an equation:

$$t_F = \frac{9}{5} t_C + 32, \quad (1)$$

which shows that the freezing point 0° C. and boiling point 100° C. of water under a pressure of 1 atmosphere correspond to 32° F. and 212° F., respectively.

In a temperature measuring apparatus devised so as to analog-display on an analog meter a temperature measured, for instance, by making use of the temperature-dependent characteristic of a semiconductor device such as a transistor, the measured temperature can easily be read out in both the centigrade and the Fahrenheit scales by graduating the analog meter in both the centigrade and the Fahrenheit scales. However, in case of digitally displaying the measured temperatures, the apparatus not only necessiates, on the assumption that a temperature sensor used therein outputs a signal in proportion to a centigrade temperature value, an A-D converting means for digitally displaying the centigrade temperature value itself, but also needs, for a digital display of a corresponding Fahrenheit temperature value, either a means for digitalizing through A-D conversion a signal which is made proportional to a corresponding Fahrenheit temperature value in advance by performing an analog arithmetic operation on the output from the temperature sensor in accordance with Eq. (1), or a means for performing, in accordance Eq. (1), a digital arithmetic operation on a signal quantized in advance by A-D converting the output from the temperature sensor. The present invention employs the former system in which an analog arithmetic operation on the sensor output is followed by an A-D conversion. Relating to the system a prior art is described in the following on reference to FIG. 4:

In the figure, a temperature sensing circuit 2, which uses a transistor 1 as a temperature sensor, outputs on an output terminal 3 a voltage $e_C = kt_C$ which is proportional to a centigrade temperature $t_C$. An A-D converter 5, which has input terminals REF+ and IN+ for receiving respectively a reference voltage $e_r$ and signal voltage $e_s$, outputs a digital signal proportional to $e_s/e_r$, the ratio of the signal voltage $e_s$ to the reference voltage $e_r$. The ratio $e_s/e_r$ is displayed by a display unit 6. The A-D converter 5 is supplied at its reference voltage input terminal REF+ with the reference voltage $e_r$ obtained by dividing with the resistor 7 a stabilized positive voltage $E_a$ being supplied from a terminal 8. Further, resistors 10, 11, 12 and an operational amplifier 13 constitute an analog arithmetic operation circuit, which derives according to Eq. (1) a voltage $e_F$ proportional to a Fahrenheit temperature $t_F$ from a voltage $e_C$ ($=kt_C$) outputted to the terminal 3 in proportion to the centigrade temperature $t_C$. Either of the two voltages $e_C$ and $e_F$ is selectively inputted to the A-D converter 5 through a switch 4.

In such a circuit constitution as described above, the voltage $e_C = kt_C$ proportional to the centigrade temperature is inputted to the input terminal IN+ of the A-D converter 5 with the switch 4 turned to a contact a. On the other hand, the reference voltage $e_r$ supplied to the reference voltage input terminal REF+ of the A-D converter rom the voltage dividing resistor 7 is set at a value of $10^n$ times the sensitivity $k(=e_C/t_c)$ of the temperature sensing circuit 2, n being selected to be 2, for example, in case three figures of a temperature value is to be displayed. Namely, if $k=1$ mV/°C., $e_r=100$ mV. Therefore, a display output $C_x$ from the A-D converter shows a centigrade temperature $t_C$ given by an equation:

$$C_x = 100 \frac{e_C}{e_r} = 100 \frac{kt_C}{e_r} = t_C, \quad (2)$$

where a coefficient 100 is to determine the position of decimal point, making a displayed temperature value be 100° C. when $e_C = e_r$.

Next, for displaying a Fahrenheit temperature value with the switch 4 turned to a contact b, the resistors 10 and 11 must be coordinated so as to make the operational amplifier 13 output a voltage $e_F$ corresponding to a Fahrenheit temperature $t_F$ in accordance with an equation:

$$e_F = k\left(\frac{9}{5} t_C + 32\right), \quad (3)$$

which corresponds to Eq. (1). For the purpose, first the resistor 10 is adjusted, with a stabilized negative voltage $-E_d$ supplied thereto through a terminal 9, so that $e_F$ may be equal to $32k$ when $t_C = 0$, and secondly the resistor 11 is adjusted so that $e_F$ may be equal to $212k$ corresponding to 212° F. when $t_C = 100$° C. Such adjustments procedures make Eq. (3) valid in the circuit, and therefore, an output $F_x$ from the A-D converter shows a Fahrenheit temperature $t_F$ given by an equation:

$$F_x = 100 \frac{e_F}{e_r} = \frac{9}{5} t_C + 32. \quad (4)$$

According to this method, the voltage $e_F$ which is obtained as a voltage corresponding to a Fahrenheit temperature through an analog arithmetic operation performed on an analog signal $kt_C$ outputted from the temperature sensing circuit 2 is digitalized by the A-D converter 5 having its reference voltage kept at the same reference voltage $e_r$ that is used for displaying a centigrade temperature, and then displayed digitally.

However, in case of a transistor being used as a temperature sensor in the above method, the sensitivity of the sensor is as low as 2 mV/°C. for the centigrade temperature and 1 mV/°C. for the Fahrenheit temperature, and therefore, a possible drift error of about ±0.5 mV arising in the operational amplifier 13 causes a large quantization error of about ±1° F. in the Fahrenheit temperature value. Moreover, in case the Fahrenheit temperatures are to be displayed at a resolving power of 0.1° F., a drift error of ±50 μV results in a quantization error of ±0.1° F. or more. Such errors are not encountered in case of displaying the centigrade temperature values free from an arithmetic operation, but encountered only in case of displaying the Fahrenheit temperature values.

As is understood from the above description, the prior art method of displaying temperature values selectively in the centigrade scale and in the Fahrenheit scale needs an operational amplifier to convert a centigrade temperature value to a corresponding Fahrenheit value, and moreover, the operational amplifier must disadvantageously be of high precision to suppress the error due to the amplifier to a negligibly small value.

DISCLOSURE OF THE INVENTION

The present invention is characterized in that, to avoid the above disadvantage accompanying the pior art, the derivation of a Fahrenheit temperature value from a centigrade temperature value is by means of a circuit consisting only of resistors as shown in FIG. 2, instead of using an operational amplifier (given a reference number 13 in FIG. 4). The principle of the present invention is described in the following on reference to FIG. 2.

In the figure a temperature sensing circuit 2a (which is described in detail in the section of "The Best Mode for Embodying the Invention") outputs a voltage $e_C = kt_C$ to a terminal 29 through a terminal 3a and a line 30 in proportion to a centigrade temperature $t_C$, k being the sensitivity of the circuit. On the other hand, a stabilized positive voltage $E_s$ externally supplied to a terminal 21 is divided by resistors 23 and 24 to output a voltage $e_{rc}$ to a terminal 26. The voltage $e_{rc}$ is further divided by a potentiometer type resistor 24 to output to a terminal 27 a voltage reduced further to $\beta e_{rc}$ ($\beta < 1$). In addition, between the line of the terminal 21 to which the voltage $E_s$ is supplied and the output line 30 of the temperature sensing circuit 2a, there is inserted another potentiometer type resistor 22, whose divided-voltage output terminal is led to a terminal 28.

Suppose that this potentiometer type resistor 22 has its sliding contact set at the position where the resistance from the line 30 is the total resistance multiplied by $\beta$ ($< 1$), the relative potential at the terminal 28 to the potential at the terminal 29 is given by $\alpha(E_s - kt_C)$, and therefore the terminal 28 outputs a voltage consisting of the sum of said potential and the potential of the line 30:

$$e_f = \alpha(E_s - kt_C) + kt_C \qquad (5)$$
$$= (1 - \alpha) kt_C + \alpha E_s.$$

In such a circuit constitution a centigrade temperature display is made by inputting a voltage $e_C = kt_C$ of the terminal 29 to an A-D converter (not shown) with the voltage $e_{rc}$ of the terminal 26 being used as a reference voltage of the converter. The A-D converter, which is of a potentiometric type, outputs a ratio of the signal voltage to a reference voltage, and gives a numerical figure of 1000 in case the ratio being unity (that is, in case the signal voltage being equal to the reference voltage), meaning 1.000. In practice, therefore, the reference voltage $e_{rc}$ should be chosen to be k multiplied by $10^n$. In order to make the numerical figure 1000 correspond to 100° C., it is necessary to choose a relation $e_{rc} = 100k$ (n=2) and, further, to displace the decimal point rightward by two ciphers, thereby enabling 100.0 to be displayed. Thus the A-D converter has its display output $C_x$ made equal to a centigrade temperature value $t_c$:

$$C_x = \frac{e_C}{e_{rc}} = \frac{100 k t_C}{100k} = t_C, \qquad (6)$$

where a factor 100 in the denominator means the above-mentioned two-cipher displacement of the decimal point.

Next, in case of displaying a Fahrenheit temperature $t_F$, the voltage $e_f$ given by Eq. (5) and outputted at the terminal 28 is inputted to the signal input terminal of the A-D converter, while the voltage $e_{rf} = \beta e_{rc}$ at the terminal 27 is used as a reference signal of the A-D converter. Considering $e_{rf} = \beta e_{rc} = 100 \beta k$ due to the voltage $e_{rc}$ having been chosen, as described previously in relation to Eq. (6), to be 100 times the sensitivity k of the temperature sensing circuit, Eq. (5) which gives $e_f$, and the factor 100 for determining the position of the decimal point, the display output $F_x$ of the A-D converter is given by:

$$F_x = \frac{e_f}{e_{rf}} = 100 \frac{(1 - \alpha) k t_C + \alpha E_s}{100 \beta k} \qquad (7)$$
$$= \left( \frac{1}{\beta} - \frac{\alpha}{\beta} \right) t_C + \frac{\alpha}{\beta k} E_s.$$

Accordingly, if $\alpha$ and $\beta$ are chosen so as to satisfy the following relations $$\frac{1}{\beta} - \frac{\alpha}{\beta} = \frac{9}{5}, \qquad (8)$$

and $$\frac{\alpha}{\beta k} E_s = 32, \qquad (9)$$

Eq. (7) is reduced to:

$$F_x = \frac{9}{5} t_C + 32 (= t_F), \qquad (10)$$

to make the A-D converter output a Fahrenheit temperature value $t_F$. In order to make $\alpha$ and $\beta$ satisfy Eqs. (8) and (9), first apply to Eq. (8) a relation $$\frac{\alpha}{\beta} = \frac{32k}{E_s}$$

derived from Eq. (9), and obtain a relation:

$$\frac{1}{\beta} - \frac{32k}{E_s} = \frac{9}{5}.$$

This can be solved with respect to $\beta$ to give:

$$\beta = \frac{1}{\frac{9}{5} + \frac{32k}{E_s}} = \frac{5E_s}{9E_s + 5 \times 32k} \quad (11)$$

$$= \frac{E_s}{\frac{9}{5}E_s + 32k} \text{ or}$$

$$= \frac{E_s}{1.8E_s + 32k}.$$

Next, apply the thus obtained $\beta$ to a relation $$\alpha = \frac{32}{E_s} k\beta$$

derived from Eq. (9), and obtain $\alpha$ as below:

$$\alpha = \frac{32}{E_s} k \frac{E_s}{1.8E_s + 32k} \quad (12)$$

$$= \frac{32k}{1.8E_s + 32k} = \frac{k}{\frac{1.8}{32}E_s + k} \text{ or}$$

$$= \frac{k}{0.05625E_s + k}.$$

Therefore, if $\alpha$ and $\beta$ are chosen so as to respectively satisfy Eqs. (12) and (11) in accordance with the voltage $E_s$ supplied to the terminal 21 and the sensitivity k of the temperature sensing circuit 2a.

THE BEST MODE FOR EMBODYING THE INVENTION

Figure 3:
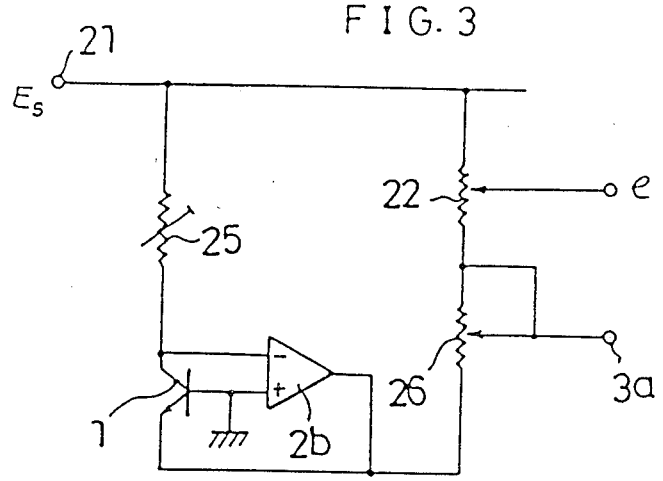
FIG. 3 shows a circuit constitution of the temperature sensing circuit used in the embodiment of the present invention.
Figure 4:
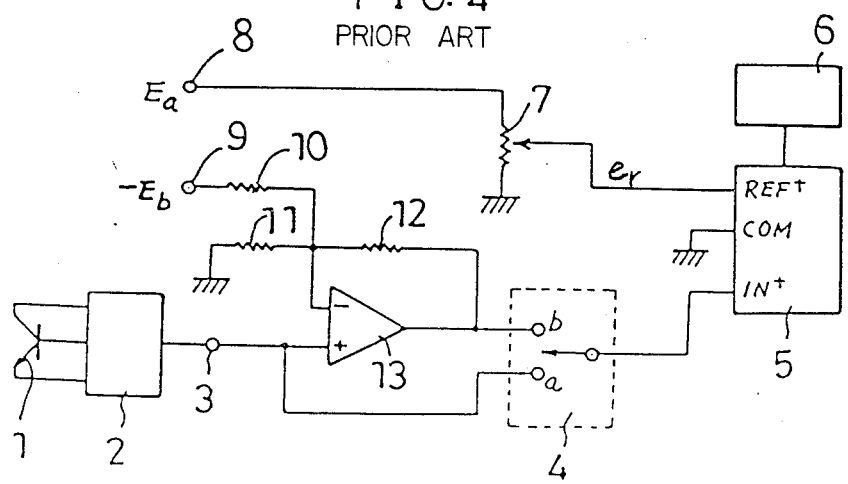
FIG. 4 shows a circuit constitution of an apparatus according to a prior art.

The most preferable embodiment of the present invention is described in the following on reference to FIGS. 1 and 3.

Figure 1:
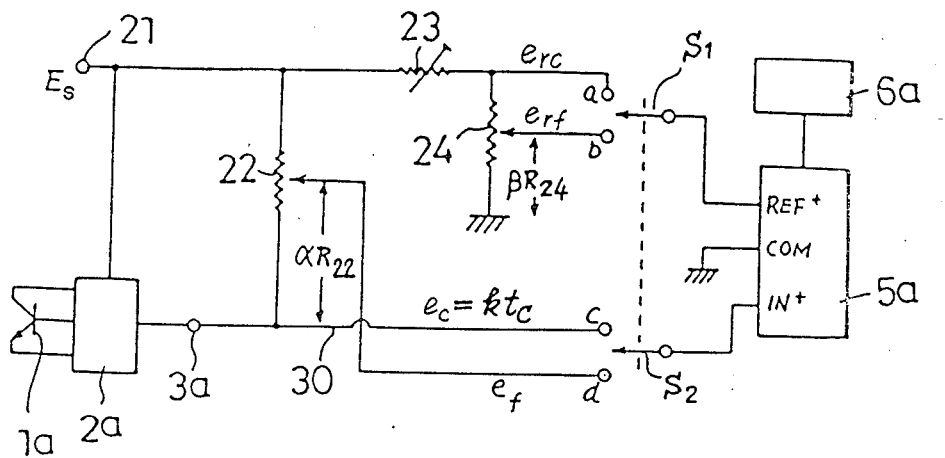
FIG. 1 shows the circuit constitution of an embodiment of the present invention.
Figure 2:
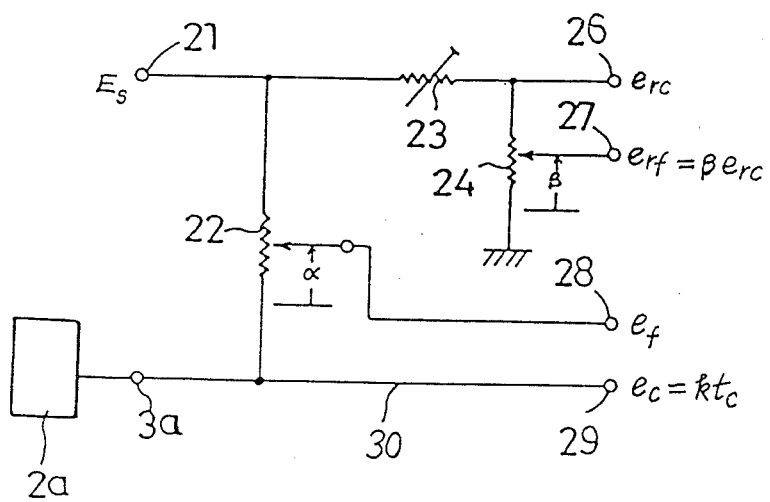
FIG. 2 shows a partial circuit constitution representing the characteristic part of the present invention.

In FIG. 1, which shows the entire circuit constitution of an embodiment of the present invention, a temperature sensing circuit 2a using a transistor 1a as a sensor outputs an analog voltage $e_C = kt_C$ proportional to a centigrade temperature $t_C$, and the voltage is led to a contact c of a switch S2 through a terminal 3a and a line 30. A terminal 21 is supplied with a stabilized voltage $E_s$, which is reduced to a voltage $e_{rc}$ by resistors 23 and 24. The voltage $e_{rc}$ is not only led to a contact a of a switch S1 but also further reduced by a potentiometer type resistor 24 to a value of $\beta e_{rc}$ ($\beta < 1$), which is led as a voltage $e_{rf}$ to a terminal b of the switch S1. On the other hand another potentiometer type resistor 22 is inserted between an output line 30 of the temperature sensing circuit 2a and the terminal 21, and the divided-voltage output from the resistor 22 is led to a contact d of the switch S2. Further, the switches S1 and S2 have their respective movable contacts connected respectively to the reference voltage input terminal REF+ and the signal input terminal IN+ of an A-D converter 5a, whose output is digitally displayed by a display unit 6a. In the above circuit constitution, a partial circuit related to the resistors 22, 23 and 24 is the same as the circuit shown in FIG. 2; the contacts a, b, c and d of the switches S1 and S2 correspond respectively to the terminals 26, 27, 29 and 28 in FIG. 2.

In the above constitution the switches S1 and S2 are turned respectively to the contacts a and c for obtaining a centigrade temperature. Thus, the reference signal input terminal REF+ of the A-D converter 5a is supplied, as is described in "Disclosure of the Invention", with the reference voltage $e_{rc} = 10^n k$ through the contact a, while the signal input terminal IN+ is supplied with the output $e_C = kt_C$ from the temperature sensing circuit 2a through the contact c. Therefore, the A-D converter 5a outputs a centigrade temperature value $t_C$, which is displayed by the display unit 6a.

In case of obtaining a Fahrenheit temperature value the switches S1 and S2 are turned to the contacts b and d, respectively. The reference signal input terminal REF+ of the A-D converter 5a is supplied, as is described in "Disclosure of the Invention", with the reference voltage $e_r = \beta e_{rc}$ through the contact b, while the signal input terminal IN+ is supplied with the voltage $$e_f = (1\alpha)kt_C + \alpha E_s$$

given by Eq. (5) through the contact d. Therefore, if $\alpha$ in the above equation and $\beta$ in $e_{rf} = \beta e_{rc}$ are chosen in accordance with Eqs. (12) and (11), respectively, the A-D converter 5a outputs a Fahrenheit temperature value given by Eq. (10), and the value is displayed by the display unit 6a.

In the following the detail of the temperature sensing circuit 2a is described on reference to FIG. 3. The transistor 1 used as a temperature sensor is supplied with a collector current by the voltage $E_s$ through a resistor 25, and a voltage at the collector of the transistor 1 is inputted to the inverting input terminal of an operational amplifier 2b. On the other hand the base of the transistor 1 is grounded together with the non-inverting input terminal of the operational amplifier 2b, while the emitter is connected to the output side of the amplifier 2b. Thus the operational amplifier 2b controls the base-emitter voltage $V_{BE}$ so as to keep the base-collector voltage at zero.

The thus controlled base-emitter voltage $V_{BE}$ depends not only on the temperature but also on the collector current, and besides, on the transistor characteristic variations. Therefore, the resistor 25 is adjusted so that $V_{BE}$ may show a predetermined constant value at 0° C. In practice the base-emitter voltage $V_{BE}$ at 0° C. is set at about −0.6 V. (In case of 2SC-1740K, a NPN transistor by Rhom, for example, the emitter voltage can be set at −0.6300 V in a range of the collector current from 50 to 150 μA.) On the other hand the voltage outputted from the terminal 3a is adjusted to be zero by being positively biased with the voltage $E_s(>0)$ supplied through resistors 22 and 26.

Though such an output has its sensitivity somewhat decreased by being biased through voltage dividing resistors 22 and 26, the decrease can of course be compensated through an adjustment of the reference voltage $e_{rc}$ of the A-D converter.

As is easily understood from the above description, the apparatus according to the present invention makes it possible to precisely measure temperatures in both the centigrade and the Fahrenheit temperature scales without using a high-precision operational amplifier for deriving a Fahrenheit temperature value from a centigrade temperature, because the voltage dividing ratios $\alpha$ and $\beta$ given respectively by Eqs. (12) and (11) can be made stable against the possible ambient temperature variations by choosing the potentiometer type resistors 22, 24 and the semi-variable resistor 23 (including the resistors which are not shown in the figures, but may occasionally be used jointly therewith) to be of the same and low temperature coefficient, though the constant voltage $E_s$ must be assumed to be highly stabilized.

POSSIBILITY OF INDUSTRIAL USES

In general a digital thermometer or a digital temperature measuring apparatus only displays a centigrade temperature value as a signal proportional to a centigrade temperature. According to the present invention, however, it is made possible to display a Fahrenheit temperature value by adding a low-cost simple resistance circuit to the stabilized power source for sensing centigrade temperatures. Therefore, the present invention makes it possible to provide at a low cost a precision temperature measuring apparatus capable of digitally displaying temperatures selectively in both the centigrade scale and the Fahrenheit scale.

To make a precision apparatus by decreasing possible temperature scale conversion errors can be effected by choosing the resistors to be of the same and low temperature coefficient, and does not necessiate a conventional high precision operational amplifier.

I claim:
1. A temperature measuring apparatus devised so as to digitally display a measured temperature selectively both in the centigrade temperature scale and in the fahrenheit temperature scale, said temperature measuring apparatus comprising:
 a ratiometric A-D converter having both a signal input terminal for inputting an analog signal to be digitalized and a reference voltage input terminal;
 a temperature sensing unit outputting an analog voltage proportional to a centigrade temperature sensed by a temperature sensor;
 a first reference-voltage generating means for providing a first reference voltage to be inputted to said reference voltage input terminal of said ratiometric A-D converter when an output voltage from said temperature sensing unit is inputted to said signal input terminal of said ratiometric A-D converter for the purpose of displaying said centigrade temperature sensed by said temperature sensor;
 a voltage difference dividing means for adjustably dividing a voltage difference between a predetermined constant voltage and an output voltage from said temperature sensing unit for the purpose of outputting an analog voltage proportional to the fahrenheit temperature corresponding to said centigrade temperature sensed by said temperature sensor; and
 a second reference-voltage generating means for providing a second reference voltage to be inputted to said reference voltage input terminal of said ratiometric A-D converter when an output voltage from said voltage difference dividing means is inputted to said signal input terminal of said ratiometric A-D converter.

* * * * *